(12) United States Patent
Wang et al.

(10) Patent No.: US 8,898,145 B2
(45) Date of Patent: Nov. 25, 2014

(54) QUERY OPTIMIZATION TECHNIQUES FOR BUSINESS INTELLIGENCE SYSTEMS

(75) Inventors: Yutong (Jeffrey) Wang, Bellevue, WA (US); Marius Dumitru, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 331 days.

(21) Appl. No.: 13/160,982

(22) Filed: Jun. 15, 2011

(65) Prior Publication Data
US 2012/0323885 A1 Dec. 20, 2012

(51) Int. Cl.
*G06F 17/30* (2006.01)

(52) U.S. Cl.
CPC .... *G06F 17/30448* (2013.01); *G06F 17/30498* (2013.01)
USPC .......................................... 707/714; 707/716

(58) Field of Classification Search
CPC .......... G06F 17/30873; G06F 17/2715; G06F 17/2755; G06F 17/30675; G06F 17/30592; G06F 17/20; G06F 17/241; G06F 17/2765; G06F 17/2785; G06F 17/289; G06F 17/3061; G06F 17/30398; G06F 17/30448; G06F 17/30392
USPC .................................................. 707/714, 716
See application file for complete search history.

(56) References Cited

U.S. PATENT DOCUMENTS

| 7,181,450 | B2 | 2/2007 | Malloy et al. |
| 7,877,379 | B2 | 1/2011 | Waingold et al. |
| 2004/0054683 | A1 * | 3/2004 | Nishizawa et al. ........... 707/102 |

(Continued)

FOREIGN PATENT DOCUMENTS

KR 1020030054295 A 7/2003

OTHER PUBLICATIONS

Naydenova, et al., "An Approach of Non-Additive Measures Compression in MOLAP Enviroment", Retrieved at <<http://is.fmi.uni-sofia.bg/InaNaidenova/my_papers/InaNaydenova_NonAdditiveMeasures.pdf>>, IADIS Multi Conference on Computer Science and Information Systems, 2007, pp. 394-399.

(Continued)

*Primary Examiner* — Etienne Leroux
*Assistant Examiner* — Fariborz Khoshnoodi
(74) *Attorney, Agent, or Firm* — Nicholas Chen; Doug Barker; Micky Minhas

(57) ABSTRACT

A variety of query optimization techniques are described herein. A first query optimization technique, referred to herein as non-empty transformation, may be applied to queries that specify one or more measures, a dimensional context within which the measure(s) are to be evaluated, and a filter condition specifying that rows with only empty measure values be excluded from a result set. The non-empty transformation technique enables such queries to be rewritten into another format that can be executed more efficiently than the original queries. A second query optimization technique described herein involves restructuring an operator tree representation of a query so as to avoid unnecessary duplicated evaluation of extension columns. A third query optimization technique described herein automatically selects a minimum number of join columns having the lowest cardinality for implementing a join between two tables.

20 Claims, 11 Drawing Sheets

(56) References Cited

U.S. PATENT DOCUMENTS

| | | |
|---|---|---|
| 2006/0230017 A1 | 10/2006 | Larson et al. |
| 2007/0168324 A1 | 7/2007 | Grabs et al. |
| 2007/0299836 A1 | 12/2007 | Hou et al. |
| 2008/0147627 A1 | 6/2008 | Natkovich et al. |
| 2008/0288524 A1* | 11/2008 | Dumitru et al. ............... 707/102 |
| 2008/0306906 A1* | 12/2008 | Zuzarte et al. .................... 707/2 |
| 2010/0312756 A1 | 12/2010 | Zhang et al. |
| 2010/0332548 A1 | 12/2010 | Gibson et al. |
| 2012/0317094 A1* | 12/2012 | Bear et al. ..................... 707/714 |
| 2012/0323885 A1* | 12/2012 | Wang et al. .................... 707/714 |

OTHER PUBLICATIONS

"Loading and Transformation", Retrieved at <<http://download.oracle.com/docs/cd/B19306_01/server.102/b14223/transform.htm>>, Retrieved Date: Apr. 6, 2011, pp. 19.

Wilkie, et al., "Cubes by Design", Retrieved at <<http://www.teradata.com/tdmo/v08n03/pdf/AR5728.pdf>>, Sep. 2008, pp. 1-3.

Boon, Sean, "Integrating Analysis Services with Reporting Services", Retrieved at <<http://technet.microsoft.com/en-us/library/aa902647%28SQL.80%29.aspx>>, Jun. 2004, pp. 25.

"International Search Report and Written Opinion", Mail Date: Feb. 15, 2013, Application No. PCT/US2012/040953, Filed date: Jun. 5, 2012, pp. 10.

* cited by examiner

QUERY OPTIMIZATION TECHNIQUES FOR BUSINESS INTELLIGENCE SYSTEMS

BACKGROUND

A typical query that is generated in a business intelligence (BI) system asks for the values of some measures that are to be evaluated in the context of some dimension attributes. The measures may include, for example, sum of sales, year-to-date sales, year-over-year growth, or the like, while the dimension attributes may include, for example, product categories, fiscal years, store locations, or the like. The execution of BI queries with MOLAP (multidimensional online analytical processing) like semantics would generate empty measure values if there is no record in a fact table for a given combination of dimension attributes. For example, if there were no sales of air conditioners in January, a measure SumOfSales would return an empty value for product="air conditioner" and month="January." A very common filter condition for such queries asks that only rows that have at least one non-empty measure be included in the result set. For example, FIG. 1 depicts a query 100 that includes such a filter condition. In particular, as shown in FIG. 1, query 100 includes a plurality of measure expressions $102_1$-$102_n$ that are to be evaluated in the context of some dimension attributes specified by a dimension sub-query or sub-queries 104. A filter 106 having a filter condition 108 is applied 110 to the measure expressions so evaluated, wherein filter condition 106 specifies that a record must contain at least one measure that is not empty to remain in the result set.

A straightforward strategy for executing a query such as query 100 is to calculate the value of each and every measure in the current dimension context and then filter away rows with only empty measure values afterwards. This naïve approach can be very slow as the combination of dimension attributes produces a query space that is substantially larger than the subspace in which the measures have real values. For example, a user may wish to calculate a year-to-date sales measure against the cross join of products and customers. Since a typical customer will purchase only a small subset of all available products, it would be extremely inefficient to calculate the year-to-date sales measure for each and every combination of product and customer and then throw away empty results afterwards.

Certain conventional BI systems utilize fact-centric modeling. The join types between fact tables and dimensions are set in the model. While the use of such a model enables efficient processing of queries that only care about existing records in the fact table, it makes answering common BI questions, such as those involving time series calculations, difficult. Such BI systems often resort to a data densification technique that requires model designers to introduce additional fake fact tables.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Moreover, it is noted that the invention is not limited to the specific embodiments described in the Detailed Description and/or other sections of this document. Such embodiments are presented herein for illustrative purposes only. Additional embodiments will be apparent to persons skilled in the relevant art(s) based on the teachings contained herein.

A variety of query optimization techniques are described herein. A first query optimization technique, referred to herein as non-empty transformation, may be applied to queries that specify one or more measures, a dimensional context within which the measure(s) are to be evaluated, and a filter condition specifying that rows with only empty measure values be excluded from a result set. The non-empty transformation technique enables such queries to be rewritten into another format for a broad category of measures, which may be referred to as sparse measures. The newly formatted queries can be executed more efficiently than the original queries.

A second query optimization technique is also described herein. This technique, which may be referred to as macro-expansion, involves restructuring an operator tree representation of a query so as to avoid unnecessary duplicated evaluation of extension columns.

A third query optimization technique is also described herein. This technique, which may be referred to as strength reduction, automatically selects a minimum number of join columns having the lowest cardinality for implementing a join between two tables.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the present invention and, together with the description, further serve to explain the principles of the invention and to enable a person skilled in the relevant art(s) to make and use the invention.

Figure 10:
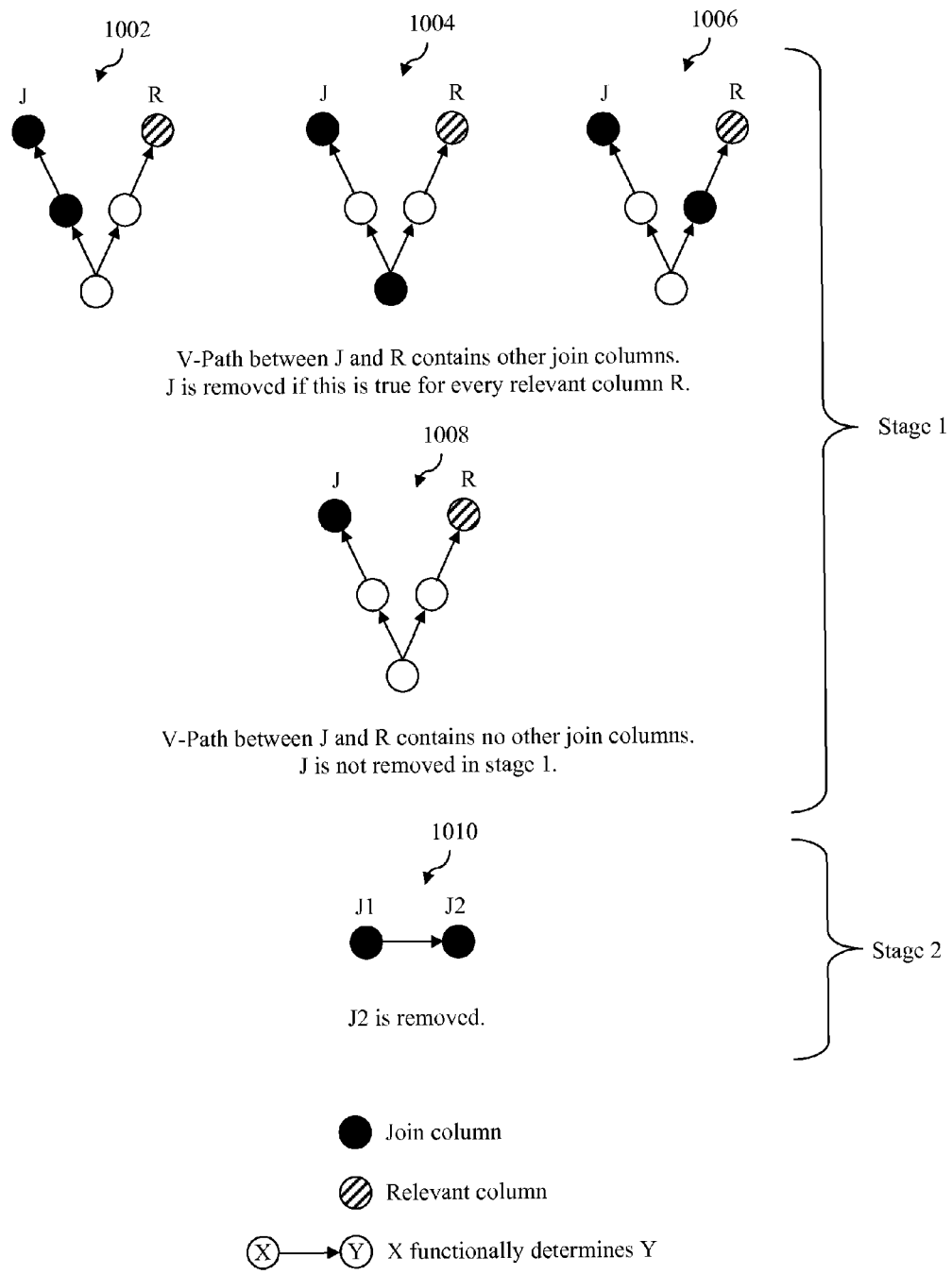

FIG. 10 provides illustrations that are helpful in understanding a strength reduction query optimization algorithm in accordance with an embodiment.

Figure 11:
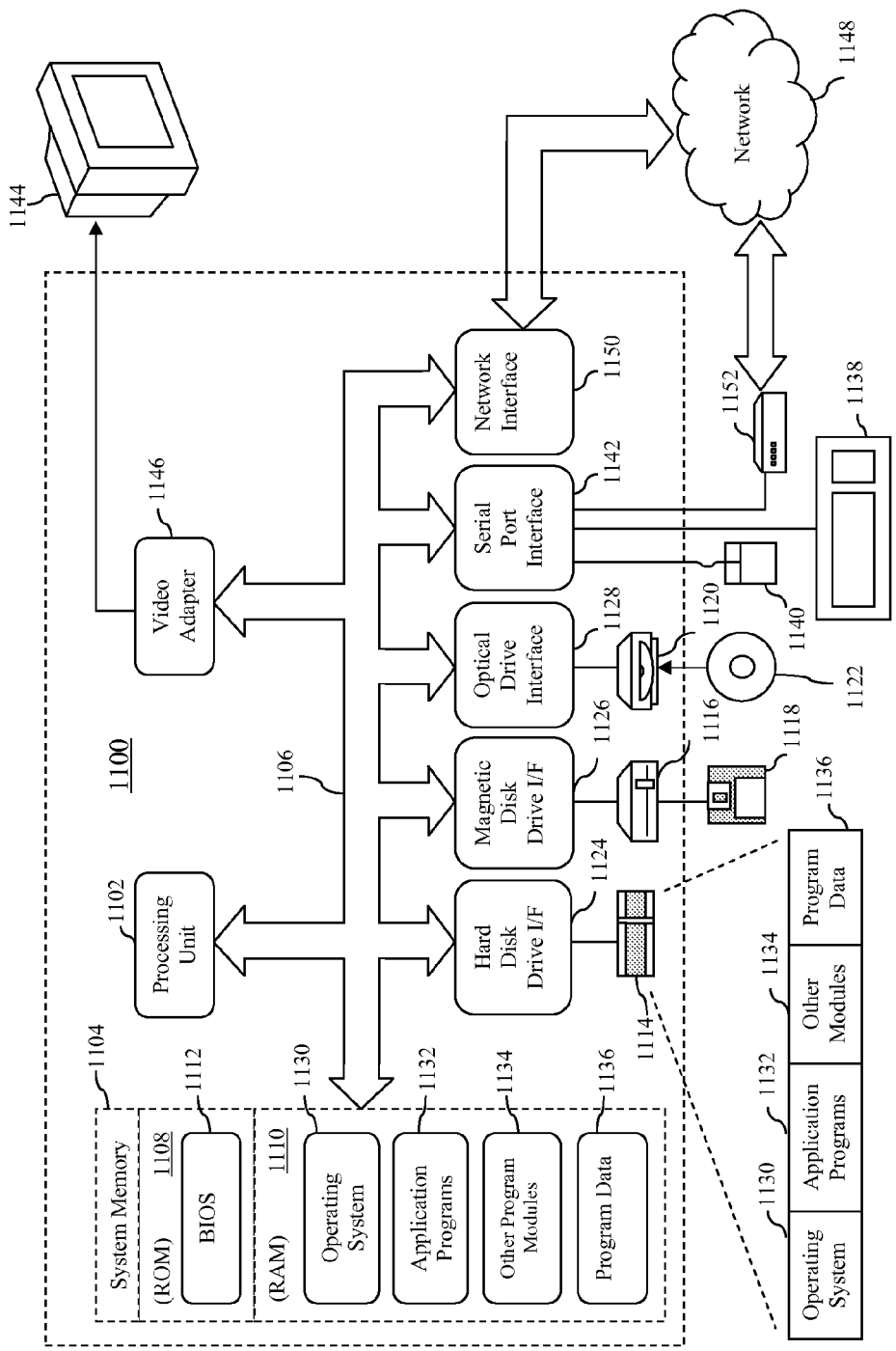

FIG. 11 is a block diagram of an example computer system that may be used to implement various embodiments described herein.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the relevant art(s) to implement such feature, structure, or characteristic in connection with other embodiments whether or not explicitly described.

A variety of query optimization techniques are described herein. A first query optimization technique, referred to herein as non-empty transformation, may be applied to queries that specify one or more measures, a dimensional context within which the measure(s) are to be evaluated (wherein the dimensional context may be represented by one or more dimension sub-queries), and a filter condition specifying that rows with only empty measure values be excluded from a result set. The non-empty transformation technique enables such queries to be rewritten into another format for a broad category of measures, which may be referred to as sparse measures. The newly formatted queries can be executed more efficiently than the original queries.

Figure 1:
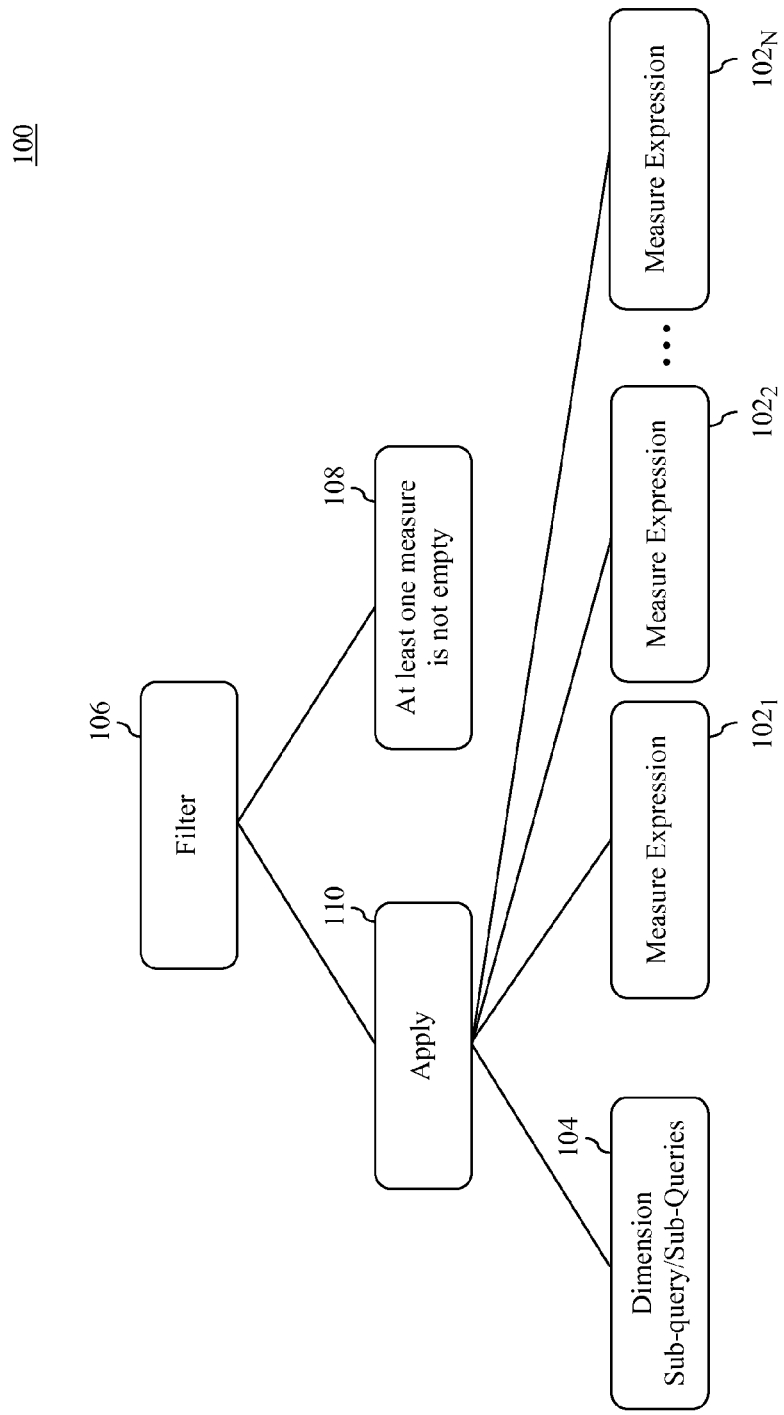
FIG. 1 depicts a query that includes a plurality of measure expressions, a dimension sub-query that specifies a context within which the measure expressions are to be evaluated, and a filter condition that specifies that a record must contain at least one measure expression that is not empty to remain in the result set.

It is noted that the query to which the non-empty transformation technique described herein can be applied may comprise a sub-query of a larger query. For example, the non-empty transformation technique may be applied to a sub-query having the pattern shown in FIG. 1.

It is conceivable that one could re-write a particular query of this type by hand in a manner that would enable more efficient execution. However, embodiments described herein provide a relational solution that is generic enough to apply to queries that include any combination of dimension attributes and any measure expressions. Consequently, a general-purpose relational engine optimizer can automatically perform the non-empty transformation against arbitrary query expressions and measure expressions.

One advantage of this technique is that it allows client software that interacts with end users to easily formulate correlated queries based on user actions. The client software can simply treat all measures as text names without the need to understand the mathematical expressions behind each measure.

A further advantage of this technique is that it can support a query language that is based on a relational model but has MOLAP semantics. Such a language can naturally solve common BI problems like time series calculations.

Another advantage of this technique is that it allows client software to specify at query time based on user input whether to remove rows with only empty measure values.

Yet another advantage of this technique is that it can be used to automatically analyze arbitrary query expressions and measure expressions to determine whether a measure is sparse in the given query context. A measure may be referred to as sparse if it has a static value in most of the theoretical space.

Still another advantage of this technique is that it can be used to automatically perform a relational transformation to generate a new query that is equivalent to the original query but takes advantage of the sparsity of the measures. In an embodiment, non-empty transformation also performs query decorrelation in the process.

A second query optimization technique is also described herein. This technique, which may be referred to as macro-expansion, involves restructuring an operator tree representation of a query so as to avoid unnecessary duplicated evaluation of extension columns.

A third query optimization technique is also described herein. This technique, which may be referred to as strength reduction, automatically selects a minimum number of join columns having the lowest cardinality for implementing a join between two tables.

II. Example System that May Implement Query Optimization Techniques

Figure 2:
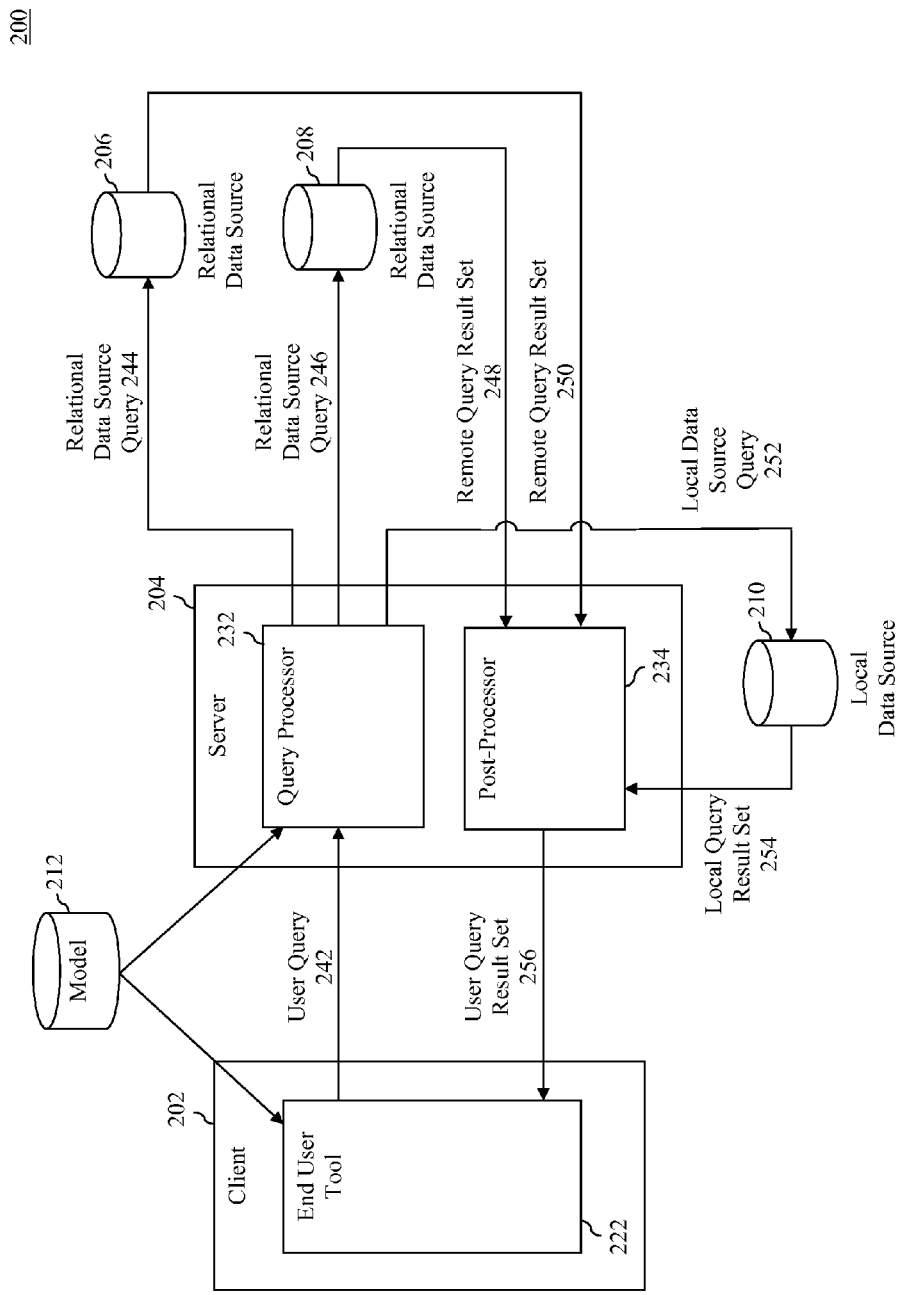
FIG. 2 is a block diagram of a system that may implement one or more query optimization techniques in accordance with one or more embodiments.

FIG. 2 is a block diagram of an example system 200 that may implement one or more query optimization techniques to be described herein. Such query optimization techniques provide for improved performance in relation to the execution of a query. It is noted that system 200 is presented herein merely by way of example only. Persons skilled in the relevant art(s) will readily appreciate that the various query optimization techniques described herein may be implemented by a wide variety of systems other than system 200 of FIG. 2.

As shown in FIG. 2, system 200 includes a client 202 that is communicatively connected to a server 204. Client 202 includes an end user tool 222 that enables a user thereof to formulate a user query 242 and that submits user query 242 to server 204 for execution thereby. End user tool 222 may include a user interface (UI) that facilitates construction of user query 242 by the user. The UI may comprise, for example, a graphical user interface (GUI). End user tool 222 is also capable of receiving a user query result set 256 obtained by server 204 in response to the execution of user query 242 and to present such result set to the user. In the embodiment mentioned above in which end user tool 222 includes a UI, such result set may be presented to the user via the UI.

In at least one embodiment, end user tool 222 comprises one or more software modules and client 202 comprises a processing unit that is capable of executing the software module(s) to enable end user tool 222 to provide the aforementioned features and functionality. Depending upon the implementation, client 202 may comprise, for example and without limitation, a desktop computer, a laptop computer, a tablet computer, a handheld computing device, a smart phone, a gaming console, a personal digital assistant, a personal media player, or the like. One example of a computer system that may be used to implement client 202 is described below in Section IV.

As further shown in FIG. 2, example system 200 includes a model 212, which contains data descriptive of one or more data sources that may be queried within system 200. The descriptive data, also referred to as metadata, may specify data fields, field attributes or properties, data tables, relationships between data fields or tables, or other data descriptive of the data source(s). Model 212 may specify or define operations that may be performed on data. It may also include predefined queries that can be employed or combined with other queries to retrieve desired data. Model 212 may further include predefined measures so that a user can add such measures to a query by simply specifying the names of those measures. Model 212 may restrict the types of user queries that can be generated by exposing a subset of available data, a subset of available operations, or a subset of the ways in which data can be retrieved or combined. Generally, a person known as a modeler creates model 212 for use with the data source(s) that may be queried within system 200.

In at least one embodiment of example system 200, model 212 is accessible to a query processor 232 of server 204 and utilized thereby to execute user query 242. Depending upon the implementation, model 212 may also be accessible to end user tool 222 and utilized thereby to ensure that user query 242 is generated in a manner that is consistent with the model.

Server 204 is operable to receive user query 242 from end user tool 222 and to execute user query 242 to obtain user query result set 256. Although server 204 is illustrated as a single entity, it is to be understood that server 204 may represent one or more servers. Each such server may be implemented, for example, in the form of a computing device, a blade in a chassis, a processor in a computing device, or the like. One example of a computer system that may be used to implement server 204 will be described below in Section IV.

Server 204 includes query processor 232 that receives user query 242 and, based on the contents of user query 242 and information provided by model 212, converts user query 242 into one or more queries that are suitable for application against one or more data sources. For example, as shown in FIG. 2, query processor 232 may convert user query 242 into a relational data source query 244 that is suitable for execution against a remote relational data source 206 and a relational data source query 246 that is suitable for execution against a remote relational data source 208. Although FIG. 2 depicts two relational data source queries being generated and each one being sent to a respective one of two relational data sources, in various configurations, one, two, or more relational data sources may be employed. One or more relational data source queries may be sent to each relational data source. Some queries may employ fewer relational data sources than are available in system 200.

As further shown in FIG. 2, query processor 232 may also transform user query 242 into a local data source query 252 that is suitable for application against a local data source 210. Local data source 210 may comprise a data source that is integrated with server 204 or that is communicatively connected to server 204 via a direct connection or a local area network. Although FIG. 2 depicts only a single local data source query 252 being generated and sent to a corresponding local data source 210, in various configurations, one, two, or more local data sources may be employed. One or more local data source queries may be sent to each local data source. Some queries may employ fewer local data sources than are available in system 200.

Relational data sources 206 and 208 may process relational data source queries 244 and 246, respectively, to generate remote query result sets 248 and 250. Relational data sources 206 and 208 may then return remote query result sets 248 and 250, respectively, to server 204. Likewise, local data source 210 may process local data source query 252 to generate local query result set 254 and may return local query result set 254 to server 204. Although not shown in FIG. 2, query processor 232 may transform user query 242 into multiple data source queries that are sent to only one data source, with one query result set being returned for each data source query received.

Server 204 also includes a post-processor 234. Post-processor 234 receives each remote query result set returned from a remote relational data source, such as remote query result sets 248 and 250, and each local query result set returned from a local data source, such as local query result set 254, and processes such result set(s) to assemble user query result set 256. Examples of operations that may be performed by post-processor 234 to assemble user query result set 256 include combination operations, result set manipulation operations, or calculation operations. A combination operation is one that combines two or more result sets. Examples of combination operations include joins or unions. A result set manipulation operation is one that changes the ordering or grouping of a result set or limits the number of rows or data elements in the result set. Examples of result set manipulation operations include orderby operations, groupby operations, filters, or the like. A calculation operation performs calculations on data included in the result sets.

It is noted that execution of some user queries may results in a single result set being received by post-processor 234, which is then passed directly to end user tool 222. In this case, the only operation being performed by post-processor 234 is passing the result set to end user tool 222. In an embodiment, a response management component of server 204 (not shown in FIG. 2) may perform actions to configure another component, such as a data source, to pass a result set directly to end user tool 222. Thus, in accordance with such an embodiment, a result set may be passed directly to client 202, bypassing server 204.

In certain embodiments, each of query processor 232 and post-processor 234 comprises one or more software modules that are executed by server 204 to provide the aforementioned features and functionality.

Communication between client 202 and server 204 and/or communication between server 204 and relational data source 206 or 208 may be carried out over a communications network. Such a communications network may include a local area network, a wide area network, direct connections, or a combination thereof. In one embodiment, the communications network includes the Internet, which is a network of networks. The communications network may include wired communication mechanisms, wireless communication mechanisms, or a combination thereof. Communications over such a communications network may be carried out using any of a variety of well-known wired or wireless communication protocols.

In one particular implementation, system 200 comprises a business intelligence (BI) system, user query 242 comprises a text query specified in a BI language such as DAX (Data Analysis Expression) or MDX (Multi-Dimensional Expression), and relational data source queries 244 and 246 comprise SQL (Structure Query Language) queries. However, these are examples only and are not intended to be limiting.

III. Example Query Optimization Techniques

In an embodiment, query processor 232 processes an incoming user query in stages, wherein the output of each stage is a different representation of the user query. This is illustrated in FIG. 3, which depicts a process flow 300 that may be implemented by query processor 232.

Figure 3:
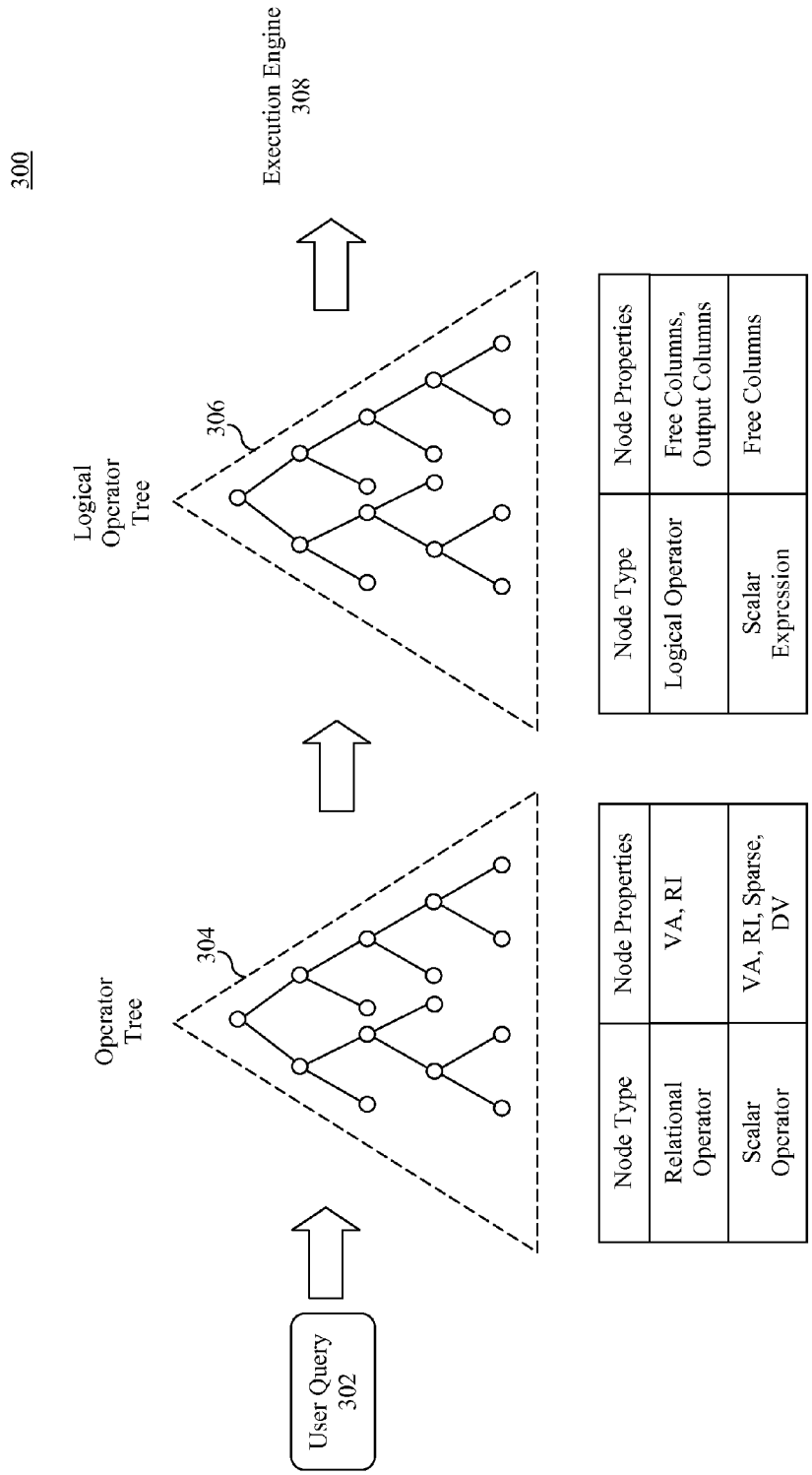
FIG. 3 depicts a process flow that may be implemented by query processor in accordance with an embodiment.

As shown in FIG. 3, query processor 232 receives a user query 302. In one embodiment, user query 302 is represented as an input query tree that is built by parsing a text representation of a user query received from a client. As further shown in FIG. 3, query processor 232 converts user query 302 into an operator tree 304, which is a further representation of the same user query. As will be discussed herein, query processor 232 builds operator tree 304 in a manner that takes advantage of data sparsity and thus facilitates a query optimization technique referred to herein as non-empty transformation. As still further shown in FIG. 3, query processor 232 then converts operator tree 304 into a logical operator tree 306, which is still another representation of user query 302. During this step, the non-empty transformation technique mentioned above is completed. This application of the non-empty transformation technique results in the generation of a query representation that can be executed more efficiently. Query processor 232 then provides logical operator tree 306 to an execution engine for local execution or to a remote data source for remote execution.

In an embodiment, each of the query optimization techniques described below is implemented as a part of process flow 300 depicted in FIG. 3. That is to say, each of the query optimization techniques is implemented as part of building of operator tree 304 and/or logical operator tree 306 for a given user query. It is noted, however, that the query optimization techniques described herein are not limited to process flow 300 of FIG. 3 and may be implemented as a part of other process flows.

A. Non-Empty Transformation and Macro-Expansion

A non-empty transformation technique that may be applied to a query to improve the efficiency with which such a query is executed will now be described. As noted above, the non-empty transformation technique may be carried out by building an operator tree for a user query, such as operator tree 304, in a manner that takes advantage of data sparsity and by then converting the operator tree into a logical operator tree, such as logical operator tree 306, in a manner that results in the performance of a non-empty transformation. In the context of describing the non-empty transformation technique below, another query optimization technique referred to herein as macro-expansion will also be described.

Figure 4:
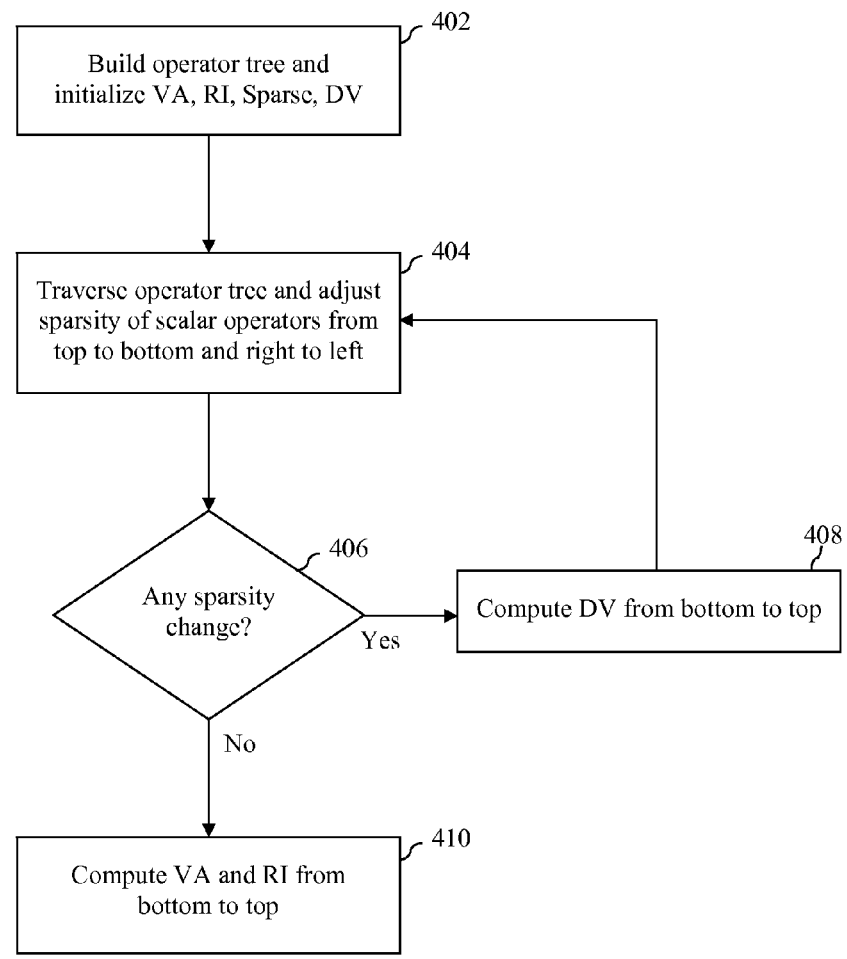
FIG. 4 depicts a flowchart of a method of building an operator tree representation of a query in a manner that takes advantage of data sparsity in accordance with one embodiment.

FIG. 4 depicts a flowchart 400 of a method of building an operator tree for a query in a manner that takes advantage of data sparsity in accordance with one embodiment. In one embodiment, the method of flowchart 400 is carried out by query processor 232 responsive to the receipt of user query 242 as described above in reference to example system 200 of FIG. 2. However, the method is not limited to that embodiment and persons skilled in the relevant art(s) will appreciate that the method may be carried out by other components or systems entirely.

As shown in FIG. 4, the method of flowchart 400 begins at step 402 in which the operator tree is built. This process involves creating the nodes of the operator tree and establishing any parent-child relationships there between. There are two types of nodes in an operator tree: relational operators and scalar operators. A relational operator is used to represent a table-valued function such as projection, crossjoin, groupby, or the like, while a scalar operator is used to represent a scalar-valued function that can be, for example, a mathematical function, a logical function, a string function, a datetime function, or the like. An operator in the operator tree may have any number of child operators. In most cases, sibling operators sharing the same parent are independent of each other. In contrast, child operators of Apply operators are correlated. There are three Apply operators: ScalarApply, CrossApply and OuterApply. Apply operators are relational operators. ScalarApply implements the Extend operation in relational algebra. CrossApply and OuterApply behave in a like manner to their counterparts in Transact-SQL (T-SQL). By convention, every Apply operator splits its sub-tree into a left side and a right side, with the right side dependent upon the left side.

The ScalarApply operator supports both user-defined extension columns and internal extension columns. Many other operators, such as Filter, Aggregate, OrderBy, and the like, build their functionalities on top of ScalarApply. For example, Filter (Table, Predicate) and Aggregate (Table, Value) can be represented as Filter (Extend (Table, Predicate as p), p) and Aggregate (Extend (Table, Value as v), v) respectively. This alternate representation enables ScalarApply to be utilized as a child operator of Filter and Aggregate and also makes ScalarApply the only relational operator that contains child scalar operators. One advantage of this design is that a scalar operator does not need to output any columns. Rather, its parent ScalarApply operator will output all columns on behalf of its child scalar operators.

As further shown in FIG. 4, during step 402 the various properties associated with each operator tree node are initialized. Every node in the operator tree has the following two properties: Varying Attributes (VA) and Relational Information (RI). The VA of an operator identifies any columns produced by a relational operator on a left side of the operator tree that the operator sub-tree depends upon. These columns embody the correlation between an operator and the left side of the tree. Another way to look at VA is that these attributes represent input parameters to the function represented by the operator. If an operator does not depend on any columns produced by a relational operator on the left side of the tree, then VA will be empty for that operator. The RI of an operator represents the list of columns from the schema of the operator. In other words, the RI of an operator identifies the output columns of the operator. If an operator does not output any columns, then RI will be empty for that operator.

VA and RI are initialized from bottom to top when the operator tree is built during step 402. However, these properties may be changed during subsequent steps of flowchart 400. A leaf-level relational operator called TableValue has selected columns from an extended base table schema as its RI. A non-leaf level relational operator such as CrossJoin derives its RI from the RIs of its child operators. Although scalar operators normally do not output columns, such operators still possess the RI property in order to support a query optimization technique referred to herein as macro-expansion. The macro-expansion technique will be described below.

In addition to the common properties VA and RI, every scalar operator in the operator tree has two additional properties which are related to each other: Sparse and Default Value (DV). A scalar operator is sparse (Sparse=True) in a given context if the scalar-valued function that it represents assumes a static value in most cases in the theoretical space in which the function is evaluated, and when that is true, DV will store that static value. When a scalar operator is not sparse, it is said to be dense (Sparse=False).

Both Sparse and DV are also initialized from bottom to top when the operator tree is built during step 402. A leaf-level scalar operator starts as either sparse, like a constant value, or dense, like a column reference to a base table column. A non-leaf scalar operator may derive its properties from its child operators. For example, a plus operator is sparse if both its child operators are sparse and the DV of the plus operator is equal to the sum of the DVs of its child operators. The sparsity of a scalar operator is not determined based on the statistics of the underlying tables, but rather on the topology of the database schema which may be determined from the model (such as model 212 in FIG. 2). For example, in a database schema in which the fact table comprises a sales table, aggregation function Sum (InternetSales[Amount]) may be considered sparse with DV=empty since it can be calculated by scanning the fact table to obtain the sum while the potential query space, the crossjoin of all dimension keys, can be orders of magnitude larger than the number of records in the fact table.

In building the operator tree, a column reference to an extension column is translated to an ExtColValue scalar operator. The sparsity of this operator depends on the sparsity of the scalar operator associated with the extension column. As will be described elsewhere herein, ExtColValue operators may be leveraged to support a macro-expansion query optimization technique. Depending on what other operators are present in the operator tree, macro-expansion may be disabled for a sub-tree. In this case, the affected ExtColValue scalar operators will always be dense, just like a column reference to a base table column.

As shown in FIG. 4, after the operator tree has been built and the operator properties have been initialized in step 402, an iterative process is begun at step 404 in which the operator tree is traversed and the sparsity of the scalar operators is adjusted from top to bottom and right to left. During this iterative process, the sparsity of a scalar operator may change but only in one direction: from sparse to dense. This ensures that the process will be finite. During step 404, a child operator may be changed from sparse to dense if it is determined that its parent does not support sparse child operators or if it is determined that its parent has become dense itself after one of its other child operators became dense.

During the traversal carried out in step 404, the sparsity of extension columns are collected from the right side of the operator tree and passed to the left side. When a ScalarApply operator is encountered, the scalar operators associated with its extension columns are prepared based on information collected from the right side of the operator tree. If an extension column is determined to be sparse based on input from the right side of the tree, the extension column and its associated scalar operator are moved to the right side of the tree to where the corresponding ExtColValue operator is. As a result, a column from the RI of a left side ScalarApply relational operator in the operator tree may move to the RI of a scalar operator sub-tree on the right side of the operator tree. This movement is referred to herein as macro-expansion since an extension column reference is replaced by an entire scalar sub-tree.

Figure 5:
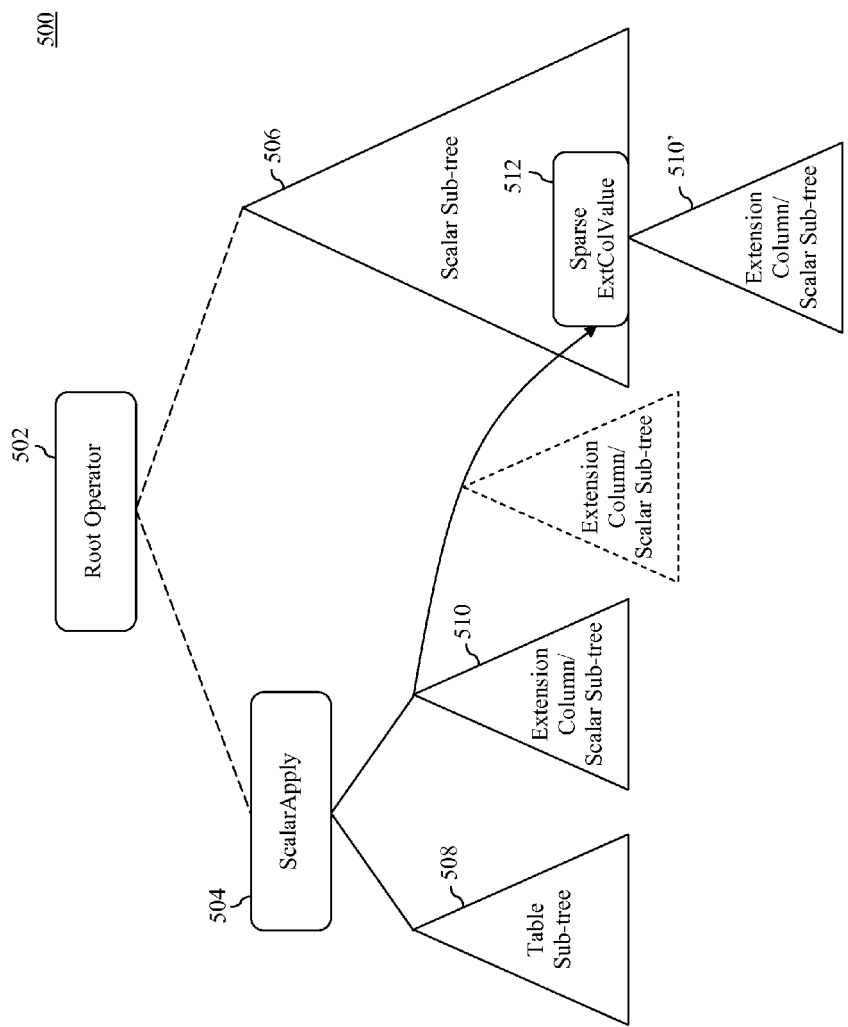
FIG. 5 illustrates an example of a macro-expansion query optimization technique in accordance with an embodiment.

One example of the macro-expansion process 500 is illustrated in FIG. 5. As shown in FIG. 5, a query in the form of an operator tree includes a root operator 502 having a ScalarApply operator 504 as a left child and a scalar sub-tree 506 as a right sub-tree. ScalarApply operator 504 has a table sub-tree 508 as a left sub-tree and an extension column and its scalar sub-tree 510 as a right sub-tree. ScalarApply operator 504 is intended to extend the table output by table sub-tree 508 with the extension column associated with extension column/scalar sub-tree 510. The table output by table sub-tree 508 may represent, for example, a dimensional context within which a measure represented by the extension column of extension column/scalar sub-tree 510 is to be evaluated. The scalar sub-tree in extension column/scalar sub-tree 510 is utilized to calculate the value of each row in the extension column.

As further shown in FIG. 5, scalar sub-tree 506 represents a sub-tree in which the extension column is actually used. Here, the extension column is represented by an ExtColValue reference 512 which is determined to be sparse. In accordance with the macro-expansion technique described above, since the extension column is sparse based on input from scalar sub-tree 506, extension column/scalar sub-tree 510 is removed from beneath ScalarApply 504 and becomes a sub-tree of ExtColValue 512 in scalar sub-tree 506, where it is represented as extension column/scalar sub-tree 510'. The extension column is then removed from the RI associated with ScalarApply 504 and included in an RI associated with scalar sub-tree 506. This enables root operator 502 to determine from which entity to obtain the extension column. By moving extension column/scalar sub-tree 510 in this manner, the execution of the query will be made more efficient because the values of the extension column will not need to be calculated for every single row of the table output by table sub-tree 508.

Returning now to the description of flowchart 400, after the operator tree has been traversed in step 404, a determination is made as to whether the sparsity associated with any of the scalar operators was modified during the traversal. This is represented in FIG. 4 by decision step 406. If any sparsity changes were made then the DV associated with each of the scalar operators is re-computed from bottom to top to take into account such changes as shown at step 408. The iterative process beginning at step 404 is then re-initiated and continues until no sparsity changes are made to the scalar operators of the operator tree. At this point, control flows to step 410.

During step 410, the operator tree is traversed once again from bottom to top to calculate the final VA and RI properties for each node in the operator tree. After step 410 completes, the properties of all the nodes in the operator tree will have been deduced.

At this point, the operator tree may be converted into a logical operator tree. This conversion may be carried out in a manner that results in the performance of a non-empty transformation as will be described below.

First, however, the logical operator tree will be described. Generally speaking, the nodes of the logical operator tree are simpler than the nodes of the operator tree. There are two types of nodes in the logical operator tree: logical operators and scalar expressions. A logical operator implements any one of the operators in relational algebra. In general, a logical operator behaves like a table-valued function in T-SQL. Accordingly, a logical operator has input columns and output columns. The input columns, called free columns, come from the left side of an apply operator and behave like input parameters to a table-valued function. The output columns are the columns of the returned table. Scalar expressions provide mathematical calculation services. Such expressions return a single scalar value based on some input values. For example, a plus scalar expression obtains two numeric values from its two child nodes, adds the two values together, and returns the sum value as its own output. In general, a scalar expression sub-tree takes as input at its leaf nodes constant values or values of input columns, also called free columns, and outputs a single scalar value at the top node.

A logical operator may have child logical operators or child scalar expressions. A leaf level logical operator fetches a list of columns from an extended base table and optionally removes duplicate rows. An extended base table is a base table joined with all its related base tables as defined by a model (for example, as defined by model 212 of system 200). A scalar expression may only have child scalar expressions. A leaf level scalar expression is either a constant scalar value or a column value binding to an output column of some logical operator.

Figure 6:
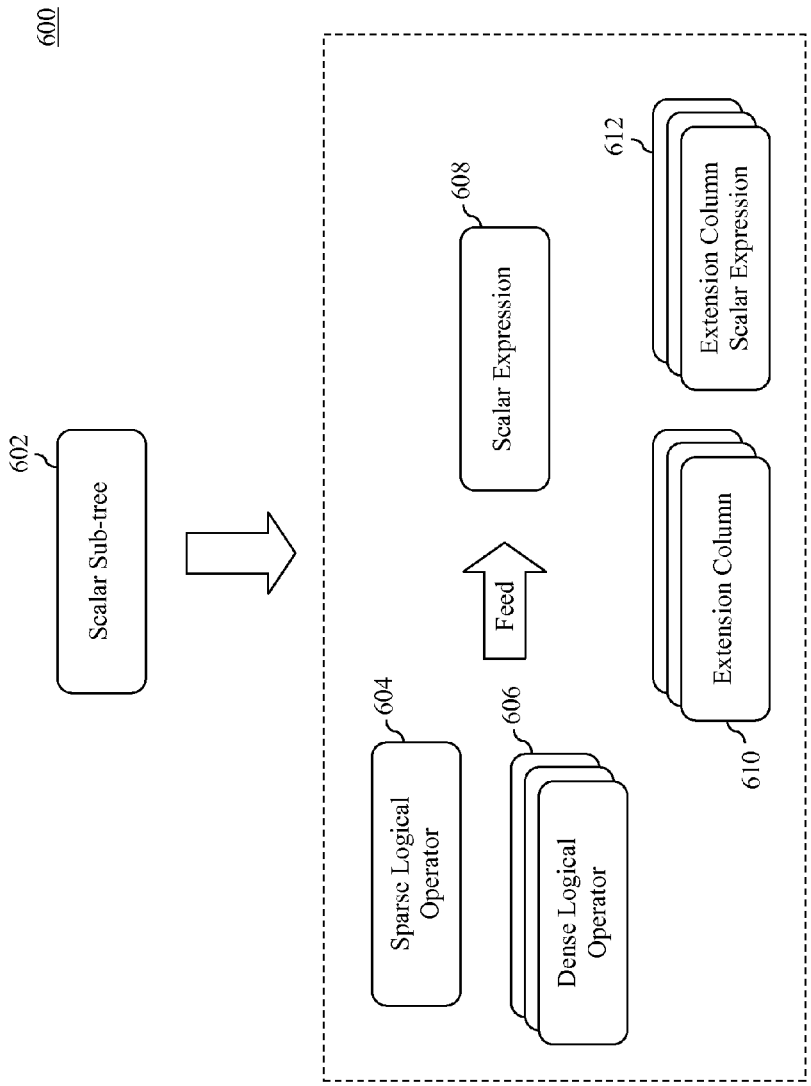
FIG. 6 illustrates how a non-empty transformation query optimization technique converts a scalar sub-tree of an operator tree into a plurality of logical operator tree nodes in accordance with an embodiment.

As noted above, building the logical operator tree may comprise performing a non-empty transformation that is facilitated by the manner in which the operator tree is built. At the end of the non-empty transformation, a scalar operator sub-tree from the operator tree produces a single logical operator corresponding to the sparse part of the tree if the scalar operator is sparse, a list of logical operators corresponding to the dense part of the tree, a scalar expression, and optionally a list of macro-expanded extension columns and their scalar expressions. An example of this process 600 is illustrated in FIG. 6, which shows how a sparse scalar sub-tree 602 is converted into a single sparse logical operator 604 corresponding to the sparse part of scalar sub-tree 602, a list of dense logical operators 606 corresponding to the dense part of scalar sub-tree 602, a scalar expression 608, a list of macro-expanded extension columns 610 and their scalar expressions 612.

The process that provides this composite output begins at leaf-level nodes of the operator tree. Each leaf-level node produces a logical operator and a scalar expression of the logical operator tree. An aggregation function in the operator tree produces a logical operator, called GbAgg, plus a leaf-level scalar expression, ColValue, that is sourced from an output column of GbAgg that corresponds to the aggregated value. While all non leaf-level nodes of the operator tree build new scalar expressions on top of child scalar expressions in the logical operator tree, a sparse non-leaf level node also produces a new logical operator from the logical operators of its sparse child nodes. For example, a sparse plus operator generates a full outer join operator from its two child logical operators. Whenever a logical operator is added for the dense part of the tree, a ColValue node that is sourced from an output column of the logical operator is returned as the associated scalar expression. In other words, logical operators for the dense part of a scalar sub-tree in the operator tree feed the leaf-level nodes of the associated scalar expression tree in the logical operator table. The logical operator for the sparse part of a scalar sub-tree is composed through various join operations of child logical operators that also feed the leaf-level nodes of the associated scalar expression tree.

The last stage of the non-empty transformation involves the conversion of a ScalarApply relational operator. In particular, while all other relational operators translate directly to a logical operator or the combination of several logical operators, ScalarApply and its child scalar sub-trees generate a functionally equivalent logical operator tree but replace apply and outer join with inner join whenever possible. This results in a query representation that can be processed more efficiently.

Figure 7:
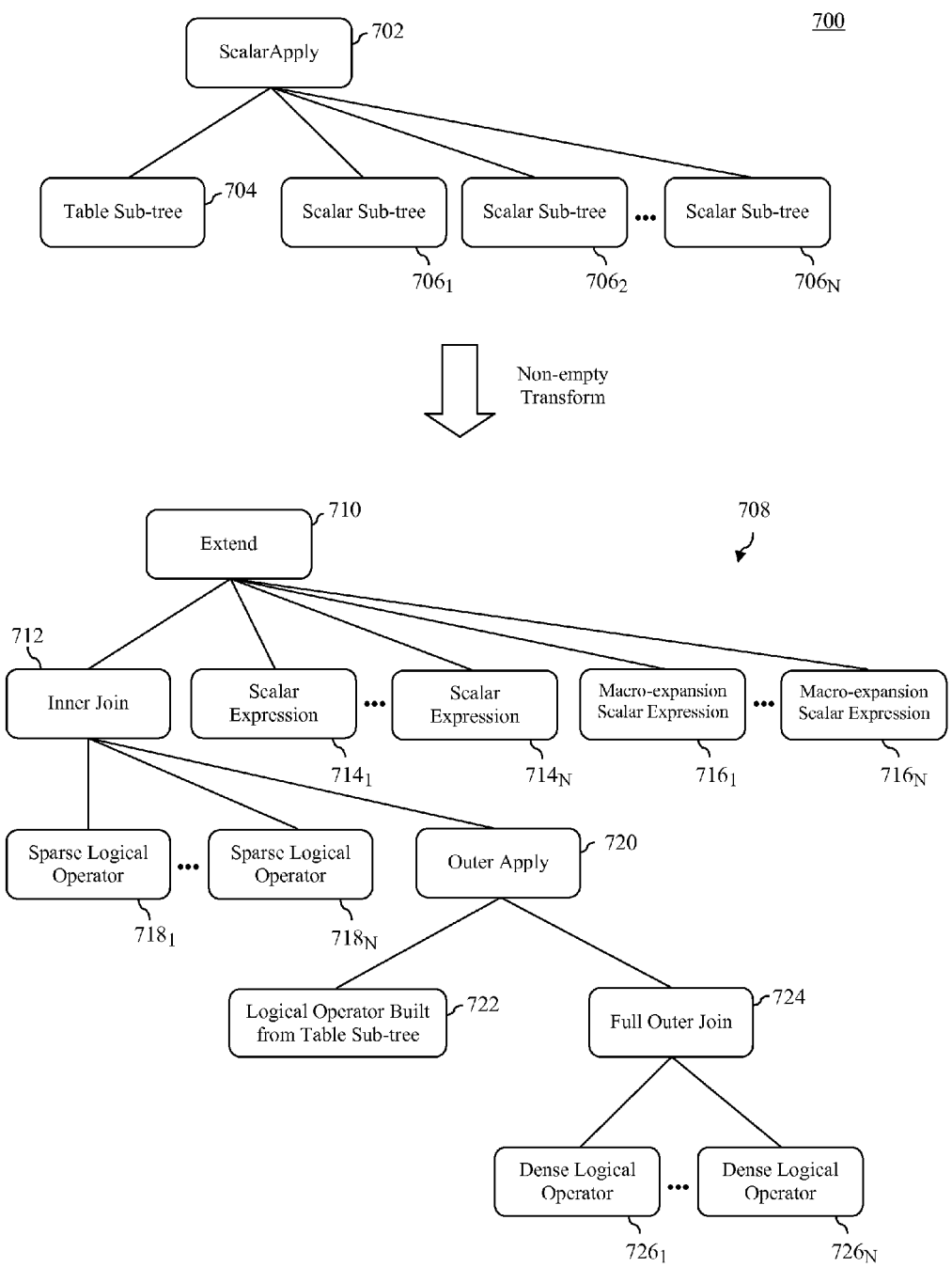
FIG. 7 illustrates a last stage of a non-empty transformation in accordance with an embodiment.

An example of this last stage of the non-empty transformation 700 is illustrated in FIG. 7. In particular, as shown in FIG. 7, a ScalarApply relational operator 702 in the operator tree has as its children a table sub-tree 704 and a plurality of scalar sub-trees $706_1$-$706_N$. Via a non-empty transformation, each scalar sub-tree $706_1$-$706_N$ is converted into the composite output described above in reference to FIG. 6. Using the composite output obtained from each scalar sub-tree $706_1$-$706_N$, ScalarApply relational operator 702 and its child scalar sub-trees are converted into a functionally equivalent logical operator tree 708.

As shown in FIG. 7, logical operator tree 708 includes a inner join logical operator 712 that performs an inner join between a table returned by each of a plurality of sparse logical operators $718_1$-$718_N$ (each of which was obtained by converting a corresponding scalar sub-tree $706_1$-$706_N$ in the manner shown in FIG. 6) and a table returned by an outer apply logical operator 720. Outer apply logical operator 720 performs an outer apply between a table returned by a logical operator 722 that is built from table sub-tree 704 and a table returned by a full outer join logical operator 724. Full outer join logical operator 724 performs a full outer join between tables returned by each of a plurality of dense logical operators $726_1$-$726_N$ (each of which was obtained by converting a scalar sub-tree $706_1$-$706_N$ in the manner shown in FIG. 6). As further shown in FIG. 7, an extend logical operator 710 extends a table returned by inner join logical operator 712 with columns returned by a plurality of scalar expressions $714_1$-$714_N$ (each of which was obtained by converting a corresponding scalar sub-tree $706_1$-$706_N$ in the manner shown in FIG. 6) and a plurality of extension column scalar expressions 716-716N (each of which was obtained by converting a scalar sub-tree $706_1$-$706_N$ in the manner shown in FIG. 6).

It is noted that there may be instances where the conversion of the scalar sub-trees as discussed above produce only sparse logical operators and no dense logical operators. In such a case, the outer apply logical operator 720 shown in FIG. 7 would simply be replaced by logical operator 722 built from table-sub tree 704. There may also be instances where no macro-expansion scalar expressions are produced by the conversion in which case macro-expansion scalar expressions $716_1$-$716_N$ would not be included in logical operator tree 708.

Furthermore, although FIG. 7 shows multiple scalar sub-trees $706_1$-$706_N$, the non-empty transformation may be performed when there is only a single scalar sub-tree, in which case logical operator tree 708 would include only a single sparse logical operator.

Figure 8:
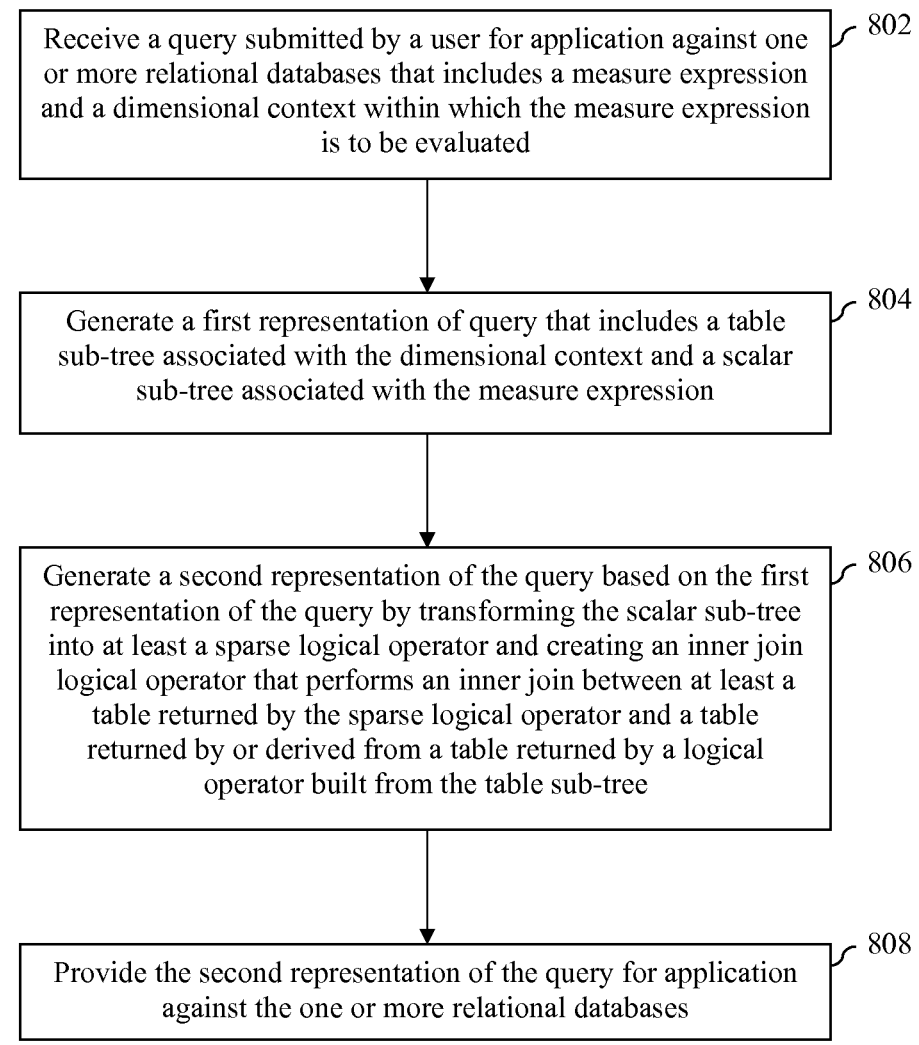
FIG. 8 depicts a flowchart of a method that further illustrates the non-empty transformation query optimization technique.

FIG. 8 depicts a flowchart 800 of a method that further illustrates the non-empty transformation query optimization technique. In one embodiment, the method of flowchart 800 is carried out by query processor 232 as described above in reference to example system 200 of FIG. 2. However, the method is not limited to that embodiment and persons skilled in the relevant art(s) will appreciate that the method may be carried out by other components or systems entirely.

As shown in FIG. 8, the method of flowchart 800 begins at step 802, in which a query that is submitted by a user for application against one or more relational databases is received. The query includes a measure expression and a dimensional context within which the measure expression is to be evaluated. An example of such a query was discussed above in reference to FIG. 1.

At step 804, a first representation of the query is generated that includes a table sub-tree associated with the dimensional context and a scalar sub-tree associated with the measure expression. In an embodiment, the first representation of the query comprises an operator tree such as operator tree 304 discussed above in reference to FIG. 3, the table sub-tree comprises table sub-tree 704 discussed above in reference to FIG. 7 and the scalar sub-tree comprises one of scalar sub-trees $706_1$-$706_N$ as also discussed above in reference to FIG. 7.

At step 806, a second representation of the query is generated based on the first representation of the query by transforming the scalar sub-tree into at least a sparse logical operator and by creating an inner join logical operator that performs an inner join between at least a table returned by the sparse logical operator and a table returned by (or derived from a table returned by) a logical operator built from the table sub-tree. In an embodiment, the second representation of the query comprises a logical operator tree such as logical operator tree 306 discussed above in reference to FIG. 3, the sparse logical operator comprises one of sparse logical operators $718_1$-$718_N$ discussed above in reference to FIG. 7, and the inner join logical operator comprises inner join logical operator 712 as also discussed above in reference to FIG. 7. As shown in FIG. 7, inner join logical operator 712 performs an inner join between at least a table returned by one of spare logical operators $718_1$-$718_N$ and a table returned by outer apply logical operator 720 which is itself derived from a table returned by logical operator 722 built from table sub-tree 704. As noted above, in an instance where there are no dense logical operators, inner join logical operator 712 would perform an inner join between at least a table returned by one of spare logical operators $718_1$-$718_N$ and a table returned by logical operator 722 built from table sub-tree 704.

At step 808, the second representation of the query is provided for application against one or more relational databases.

In one embodiment, the transforming and creating functions described above in reference to step 806 are only performed in response to determining that the query received in step 802 is not to return records for which the measure expression is empty. That is to say, the non-empty transformation technique may be performed only when it is determined that the query is not to return records having empty measures. This may be determined, for example, by analyzing the text of the query itself. For example, the query may include a filter that excludes records having empty measures.

In a further embodiment, the transforming and creating functions described above in reference to step 806 are also only performed in response to determining that the scalar sub-tree is sparse and is a child of a relational operator that extends a table returned by the table sub-tree by a column returned by the scalar sub-tree. For example, with continued reference to FIG. 7, the transforming and creating functions may only be performed in response to determining that one of scalar sub-trees $706_1$-$706_N$ is sparse and is a child of ScalarApply relational operator 702 that extends a table returned by table sub-tree 704 by a column returned by the scalar sub-tree.

In a further embodiment, step 806 comprises transforming the scalar sub-tree into at least the sparse logical operator and a corresponding scalar expression and creating an extend logical operator that extends a table returned by the inner join logical operator by a column represented by the scalar expression. For example, with continued reference to FIG. 7, step 806 may comprise transforming any one of scalar sub-trees $706_1$-$706_N$ into a corresponding sparse logical operator $718_1$-$718_N$ and a corresponding scalar expression $714_1$-$714_N$ and creating extend logical operator 710 that extends a table returned by inner join logical operator 712 by a column returned by the scalar expression.

In a still further embodiment, step 806 comprises transforming the scalar sub-tree into at least the sparse logical operator and a single dense logical operator and creating an inner join logical operator that performs an inner join between at least the table returned by the sparse logical operator and a table returned by an outer apply logical operator that performs an outer apply between a table returned by the logical operator built from the table sub-tree and a table returned by the dense logical operator. With continued reference to FIG. 7, this embodiment describes an instance in which only a single dense logical operator is generated by the non-empty transformation. In this case, outer apply logical operator 720 would operate on logical operator 722 built from table sub-tree 704 and the dense logical operator.

In another embodiment, step 806 comprises transforming the scalar sub-tree into at least the sparse logical operator and a plurality of dense logical operators and creating an inner join logical operator that performs an inner join between at least the table returned by the sparse logical operator and a table returned by an outer apply logical operator that performs an outer apply between a table returned by the logical operator built from the table sub-tree and a table returned by a full outer join logical operator that applies a full outer join to tables returned by the dense logical operators. For example, with continued reference to FIG. 7, step 806 may comprise transforming any one of scalar sub-trees $706_1$-$706_N$ into a corresponding sparse logical operator $718_1$-$718_N$ and a plurality of dense logical operators $726_1$-$726_N$ and creating inner join logical operator 712 that performs an inner join between at least the table returned by the sparse logical operator and a table returned by outer apply logical operator 720. Outer apply logical operator 720 performs an outer apply between a table returned by logical operator 722 built from table sub-tree 704 and a table returned by full outer join logical operator 724. Full outer join logical operator 724 applies a full outer join to tables returned by dense logical operators $726_1$-$726_N$.

In yet another embodiment, the generating of the first representation of the query in step 804 comprises moving a scalar sub-tree that obtains values for an extension column and that is a child of a relational operator that extends the table sub-tree by the extension column so that it becomes a child of a reference to the extension column in the scalar sub-tree associated with the measure expression. For example, with continued reference to the example illustrated in FIG. 5, this step may entail moving extension column/scalar sub-tree 510 that is a child of ScalarApply relational operator 504 so that it becomes a child of ExtColValue 512 in scalar sub-tree 506. This step was referred to above as macro-expansion.

In further accordance with an embodiment that implements macro-expansion, step 806 may comprise transforming the scalar sub-tree into at least the sparse logical operator and a scalar expression that represents the extension column and creating an extend logical operator that extends a table returned by the inner join logical operator by the extension column represented by the scalar expression. For example, with continued reference to FIG. 7, step 806 may comprise transforming any one of scalar sub-trees $706_1$-$706_N$ into a corresponding sparse logical operator $718_1$-$718_N$ and a plurality of macro-expansion scalar expressions $716_1$-$716_N$ and creating extend logical operator 710 that extends a table returned by inner join logical operator 712 by the extension columns represented by macro-expansion scalar expressions $716_1$-$716_N$.

B. Strength Reduction

In accordance with various embodiments, a leaf-level TableValue relational operator in the operator tree is joined with filter tables in context. The join type can be a natural join or a natural semijoin. These joins are implied in the model and user query. However, these joins are explicitly defined in the operator tree by adding join columns to TableValue relational operators. In the case of a semijoin, a query optimization technique, referred to herein as strength reduction, may be used to select a minimum number of join columns with the lowest cardinality.

Figure 9:
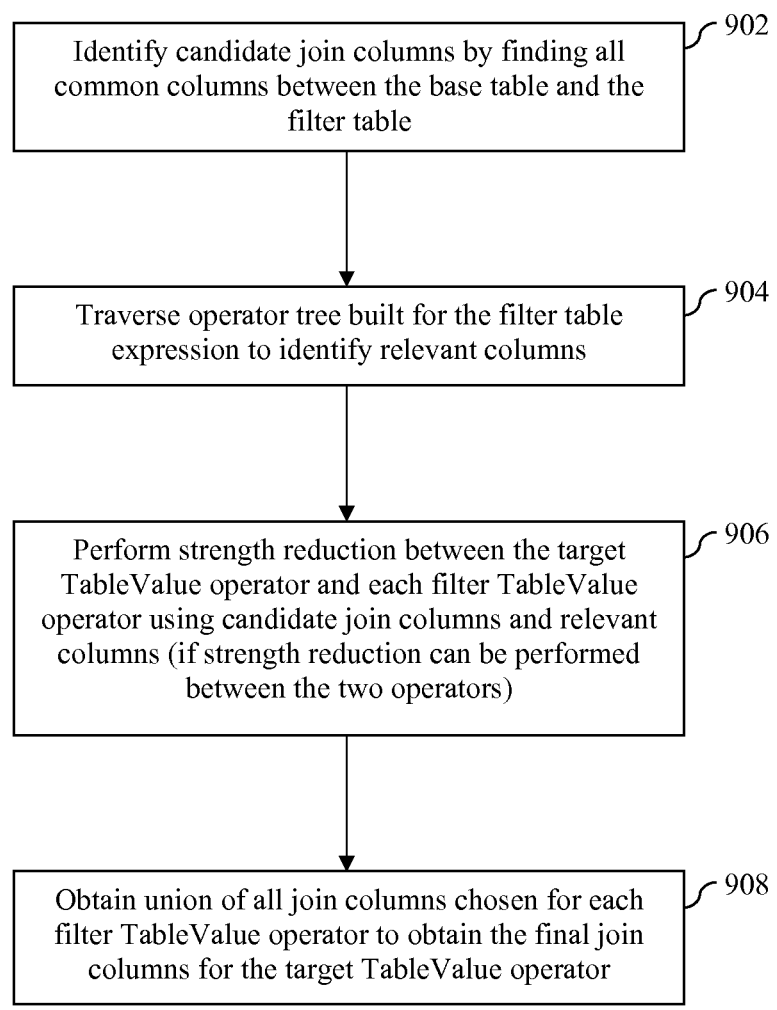
FIG. 9 depicts a flowchart of a method for performing a strength reduction query optimization technique in accordance with an embodiment.

FIG. 9 depicts a flowchart 900 of a method for performing the strength reduction technique. The method will be described in relation to performing an implicit join between a base table and a filter table as described above. However, it is noted that the strength reduction technique may advantageously be applied to any explicit or implicit join between two tables. In one embodiment, the method of flowchart 900 is carried out by query processor 232 of FIG. 2 as part of building of an operator tree. However, the method is not limited to that embodiment and persons skilled in the relevant art(s) will appreciate that the method may be carried out by other components or systems entirely.

As shown in FIG. 9, the method of flowchart 900 begins at step 902 in which candidate join columns are identified by finding all the common columns between the base table and the filter table. It is noted that the TableValue relational operator associated with the base table is called target TableValue in the following process.

At step 904, the operator tree built for the filter table expression is traversed to identify relevant columns. This step may include first creating a list of relevant columns. Then, starting with all the candidate join columns identified in step 902 and the empty list of relevant columns, the operator sub-tree built for the filter table expression is traversed and relevant columns are added. For example, a non-leaf relational operator may add relevant columns. For instance, in one embodiment, a Filter operator adds the VA of its predicate scalar operator to the relevant columns. When another TableValue operator is reached at the bottom of the filter sub-tree, its own join columns are added to the list of relevant columns. This TableValue operator will be referred to herein as filter TableValue to distinguish it from target TableValue.

At step 906, for each filter TableValue operator, if it is determined that strength reduction can be performed between the target TableValue operator and the filter TableValue operator, then the following algorithm is applied to determine join columns between the two:

```
Start the list of join columns as the candidate join columns.
For each column J in the join column list
    Set variable Remove to true
    For each column R in the relevant columns
        If the V path between J and R does not contain any other
            join column
                Set Remove to false
                Break for each loop
    If Remove is true
        Remove J from join column list
For each column J in the join column list
    For each column X in the join column list
        If X is not J and X functionally determines J
            Remove J from join column list
            Break for each loop
```

After the algorithm is applied, the remaining columns in the join column list will be the join columns for the particular filter TargetValue operator.

FIG. 10 provides illustrations that are helpful in understanding the foregoing algorithm. A first stage of the foregoing algorithm will remove a join column J if a V-path between the join column J and every relevant column R contains other join columns. A V-path exists between a first column and a second column if the value of a third column functionally determines the value of both the first and second columns, either directly or indirectly. FIG. 10 shows four example diagrams 1002, 1004, 1006 and 1008 in which a V-path exists between a column J and a column R. In each of diagrams 1002, 1004, 1006, another join column is located along the V-path. Thus, in accordance with the foregoing algorithm, J would be removed from the list of join columns provided that this was true for every relevant column R. Note that in a degenerate case in which the other join column is the same as the relevant column R, then this is also counted as a case where the V-path between J and R contains contains other join columns. In contrast, in diagram 1008, no join columns are located along the V-path. In this case, the foregoing algorithm would require that J not be removed from the list of join columns.

A second stage of the foregoing algorithm will remove a first column from the list of join columns if there is a second column in the list of join columns that functionally determines the first join column. This is illustrated by diagram 1010 in FIG. 10.

At step 908, after join columns have been identified in the above-described manner for each filter TableValue operator, a union of all the join columns chosen for each filter TableValue operator is obtained to determine the final join columns for the target TableValue operator.

IV. Example Computer System Implementations

FIG. 11 depicts an example computer system 1100 that may be used to implement various embodiments described herein. For example, computer system 1100 may be used to implement any of the following previously-described elements: client 202, end user tool 222, server 204, query processor 232, post-processor 234, relational data source 206, and relational data source 208. The description of computer system 1100 provided herein is provided for purposes of illustration, and is not intended to be limiting. Embodiments may be implemented in further types of computer systems, as would be known to persons skilled in the relevant art(s).

As shown in FIG. 11, computer system 1100 includes a processing unit 1102, a system memory 1104, and a bus 1106 that couples various system components including system memory 1104 to processing unit 1102. Processing unit 1102 may comprise one or more processors or processing cores. Bus 1106 represents one or more of any of several types of bus structures, including a memory bus or memory controller, a peripheral bus, an accelerated graphics port, and a processor or local bus using any of a variety of bus architectures. System memory 1104 includes read only memory (ROM) 1108 and random access memory (RAM) 1110. A basic input/output system 1112 (BIOS) is stored in ROM 1108.

Computer system 1100 also has one or more of the following drives: a hard disk drive 1114 for reading from and writing to a hard disk, a magnetic disk drive 1116 for reading from or writing to a removable magnetic disk 1118, and an optical disk drive 1120 for reading from or writing to a removable optical disk 1122 such as a CD ROM, DVD ROM, or other optical media. Hard disk drive 1114, magnetic disk drive 1116, and optical disk drive 1120 are connected to bus 1106 by a hard disk drive interface 1124, a magnetic disk drive interface 1126, and an optical drive interface 1128, respectively. The drives and their associated computer-readable media provide nonvolatile storage of computer-readable instructions, data structures, program modules and other data for the computer. Although a hard disk, a removable magnetic disk and a removable optical disk are described, other types of computer-readable media can be used to store data, such as flash memory cards, digital video disks, random access memories (RAMs), read only memories (ROM), and the like.

A number of program modules may be stored on the hard disk, magnetic disk, optical disk, ROM, or RAM. These program modules include an operating system 1130, one or more application programs 1132, other program modules 1134, and program data 1136. In accordance with various embodiments, the program modules may include computer program logic that is executable by processing unit 1002 to perform any or all of the functions and features of client 202, end user tool 222, server 204, query processor 232, post-processor 234, relational data source 206, and relational data source 208. The program modules may also include computer program logic that, when executed by processing unit 1102, performs any of the steps or operations shown or described in reference to FIGS. 3-9.

A user may enter commands and information into computer system 1100 through input devices such as a keyboard 1138 and a pointing device 1140. Other input devices (not shown) may include a microphone, joystick, game controller, scanner, or the like. In one embodiment, a touch screen is provided in conjunction with a display 1144 to allow a user to provide user input via the application of a touch (as by a finger or stylus for example) to one or more points on the touch screen. These and other input devices are often connected to processing unit 1102 through a serial port interface 1142 that is coupled to bus 1106, but may be connected by other interfaces, such as a parallel port, game port, or a universal serial bus (USB).

A display 1144 is also connected to bus 1106 via an interface, such as a video adapter 1146. In addition to display 1144, computer system 1100 may include other peripheral output devices (not shown) such as speakers and printers.

Computer system 1100 is connected to a network 1148 (e.g., a local area network or wide area network such as the Internet) through a network interface or adapter 1150, a modem 1152, or other means for establishing communications over the network. Modem 1152, which may be internal or external, is connected to bus 1106 via serial port interface 1142.

As used herein, the terms "computer program medium" and "computer-readable medium" are used to generally refer to non-transitory media such as the hard disk associated with hard disk drive 1114, removable magnetic disk 1118, removable optical disk 1122, as well as other media such as flash memory cards, digital video disks, random access memories (RAMs), read only memories (ROM), and the like.

As noted above, computer programs and modules (including application programs 1132 and other program modules 1134) may be stored on the hard disk, magnetic disk, optical disk, ROM, or RAM. Such computer programs may also be received via network interface 1150 or serial port interface 1142. Such computer programs, when executed by processing unit 1102, enable computer system 1100 to implement features of embodiments discussed herein. Accordingly, such computer programs represent controllers of computer system 1100.

Embodiments are also directed to computer program products comprising software stored on any computer-readable medium. Such software, when executed in one or more data processing devices, causes a data processing device(s) to operate as described herein. Embodiments may employ any computer-useable or computer-readable medium. Examples of computer-readable mediums include, but are not limited to storage devices such as RAM, hard drives, floppy disks, CD ROMs, DVD ROMs, zip disks, tapes, magnetic storage devices, optical storage devices, MEMS-based storage devices, nanotechnology-based storage devices, and the like.

In alternative implementations, each of client 202, end user tool 222, server 204, query processor 232, post-processor 234, relational data source 206, and relational data source 208 may be implemented as hardware logic/electrical circuitry or firmware. In accordance with further embodiments, one or more of these components may be implemented in a system-on-chip (SoC). The SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

V. Conclusion

While various embodiments have been described above, it should be understood that they have been presented by way of example only, and not limitation. It will be apparent to persons skilled in the relevant art(s) that various changes in form and details can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A method for optimizing a query for execution against one or more relational databases, the method comprising:
receiving a query submitted by a user, the query including a measure expression and a dimensional context within which the measure expression is to be evaluated;
generating a first representation of the query, wherein the first representation of the query comprises a table sub-tree associated with the dimensional context and a scalar sub-tree associated with the measure expression;
generating a second representation of the query based on the first representation of the query, the generating of the second representation of the query comprising:
transforming the scalar sub-tree into at least a sparse logical operator, and
creating an inner join logical operator that performs an inner join between at least a table returned by the sparse logical operator and a table returned by or derived from a table returned by a logical operator built from the table sub-tree; and
providing the second representation of the query for application against the one or more relational databases;
at least one of the receiving, generating and providing steps being performed by one or more processors.

2. The method of claim 1, wherein the transforming and creating steps are performed in response to determining that the query is not to return records for which the measure expression is empty.

3. The method of claim 1, wherein the transforming and creating steps are performed in response to determining that the scalar sub-tree is sparse and is a child of a relational operator that extends a table returned by the table sub-tree by a column returned by the scalar sub-tree.

4. The method of claim 1, wherein transforming the scalar sub-tree into at least the sparse logical operator comprises transforming the scalar sub-tree into at least the sparse logical operator and a corresponding scalar expression and wherein generating the second representation further comprises:

creating an extend logical operator that extends a table returned by the inner join logical operator by a column represented by the scalar expression.

5. The method of claim 1, wherein transforming the scalar sub-tree into at least the sparse logical operator comprises transforming the scalar sub-tree into at least the sparse logical operator and a dense logical operator and wherein creating the inner join logical operator comprises:

creating an inner join logical operator that performs an inner join between at least the table returned by the sparse logical operator and a table returned by an outer apply logical operator that performs an outer apply between a table returned by the logical operator built from the table sub-tree and a table returned by the dense logical operator.

6. The method of claim 1, wherein transforming the scalar sub-tree into at least the sparse logical operator comprises transforming the scalar sub-tree into at least the sparse logical operator and a plurality of dense logical operators and wherein creating the inner join logical operator comprises:

creating an inner join logical operator that performs an inner join between at least the table returned by the sparse logical operator and a table returned by an outer apply logical operator that performs an outer apply between a table returned by the logical operator built from the table sub-tree and a table returned by a full outer join logical operator that applies a full outer join to tables returned by the dense logical operators.

7. The method of claim 1, wherein generating the first representation of the query comprises moving a scalar sub-tree that obtains values for an extension column and that is a child of a relational operator that extends the table sub-tree by the extension column so that it becomes a child of a reference to the extension column in the scalar sub-tree associated with the measure expression.

8. The method of claim 7, wherein transforming the scalar sub-tree into at least the sparse logical operator comprises transforming the scalar sub-tree into at least the sparse logical operator and a scalar expression that represents the extension column and wherein generating the second representation further comprises:

creating an extend logical operator that extends a table returned by the inner join logical operator by the extension column represented by the scalar expression.

9. A computer program product comprising a tangible computer-readable memory device having computer logic recorded thereon for enabling a processing unit to optimize a query for execution against one or more relational databases, the computer program product comprising:

first computer program logic for enabling the processing unit to receive a query submitted by a user, the query including a measure expression and a dimensional context within which the measure expression is to be evaluated;

second computer program logic for enabling the processing unit generate a first representation of the query, wherein the first representation of the query comprises a table sub-tree associated with the dimensional context and a scalar sub-tree associated with the measure expression;

third computer program logic for enabling the processing unit to generate a second representation of the query based on the first representation of the query by transforming the scalar sub-tree into at least a sparse logical operator and creating an inner join logical operator that performs an inner join between at least a table returned by the sparse logical operator and a table returned by or derived from a table returned by a logical operator built from the table sub-tree; and fourth computer program logic for enabling the processing unit to provide the second representation of the query for application against the one or more relational databases.

10. The computer program product of claim 9, wherein the third computer program logic comprises computer program logic for enabling the processing unit to transform the scalar sub-tree into at least the sparse logical operator and create the inner join logical operator in response to determining that the query is not to return records for which the measure expression is empty.

11. The computer program product of claim 9, wherein the third computer program logic comprises computer program logic for enabling the processing unit to transform the scalar sub-tree into at least the sparse logical operator and create the inner join logical operator in response to determining that the scalar sub-tree is sparse and is a child of a relational operator that extends a table returned by the table sub-tree by a column returned by the scalar sub-tree.

12. The computer program product of claim 9, wherein the third computer program logic comprises computer program logic for enabling the processing unit to transform the scalar sub-tree into at least the sparse logical operator and a corresponding scalar expression and to create an extend logical operator that extends a table returned by the inner join logical operator by a column represented by the scalar expression.

13. The computer program product of claim 9, wherein the third computer program logic comprises computer program logic for enabling the processing unit to transform the scalar sub-tree into at least the sparse logical operator and a dense logical operator and to create an inner join logical operator that performs an inner join between at least the table returned by the sparse logical operator and a table returned by an outer apply logical operator that performs an outer apply between a table returned by the logical operator built from the table sub-tree and a table returned by the dense logical operator.

14. The computer program product of claim 9, wherein the third computer program logic comprises computer program logic for enabling the processing unit to transform the scalar sub-tree into at least the sparse logical operator and a plurality of dense logical operators and to create an inner join logical operator that performs an inner join between at least the table returned by the sparse logical operator and a table returned by an outer apply logical operator that performs an outer apply between a table returned by the logical operator built from the table sub-tree and a table returned by a full outer join logical operator that applies a full outer join to tables returned by the dense logical operators.

15. The computer program product of claim 9, wherein the second computer program logic comprises computer program logic for enabling the processing unit to generate the first representation of the query by moving a scalar sub-tree that obtains values for an extension column and that is a child of a relational operator that extends the table sub-tree by the extension column so that it becomes a child of a reference to the extension column in the scalar sub-tree associated with the measure expression.

16. The computer program product of claim 15, wherein the third computer program logic comprises computer program logic for enabling the processing unit to transform the scalar sub-tree into at least the sparse logical operator and a scalar expression that represents the extension column and to create an extend logical operator that extends a table returned by the inner join logical operator by the extension column represented by the scalar expression.

17. A method for executing a join between a first table and a second table, comprising:
generating a list of join columns that includes columns common to the first table and the second table;
identifying one or more relevant columns by at least analyzing a filter table expression with which the second table is associated;
for each join column in the list of join columns:
determining whether every V-path between the join column and a relevant column contains another join column; and
in response to determining that every V-path between the join column and a relevant column contains another join column, removing the join column from the list of join columns; and
defining a join operation between the first and the second table that utilizes join columns that have not been removed from the list of join columns,
at least one of the generating, identifying, determining, removing and defining steps being performed by one or more processors.

18. The method of claim 17, further comprising:
removing a join column from the list of join columns if another join column in the list of join columns functionally determines the join column.

19. The method of claim 17, wherein analyzing the filter table expression with which the second table is associated comprises traversing an operator sub-tree built for the filter table expression.

20. The method of claim 17, wherein the first table comprises a base table and the second table comprises a filter table.

* * * * *